United States Patent [19]

Kraus

[11] Patent Number: 4,787,795
[45] Date of Patent: Nov. 29, 1988

[54] PUSH-IN FASTENER

[75] Inventor: Willibald Kraus, Grunstadt, Fed. Rep. of Germany

[73] Assignee: TRW United-Carr GmbH, Alsenborn, Fed. Rep. of Germany

[21] Appl. No.: 905,290

[22] Filed: Sep. 9, 1986

[30] Foreign Application Priority Data

Oct. 2, 1985 [DE] Fed. Rep. of Germany ....... 3535210

[51] Int. Cl.⁴ ............................................. F16B 19/00
[52] U.S. Cl. .................................. 411/510; 411/182; 411/913
[58] Field of Search .............. 411/508, 509, 510, 512, 411/182; 24/297

[56] References Cited

U.S. PATENT DOCUMENTS

| 3,476,008 | 11/1969 | Pearson et al. | 411/508 |
| 3,727,271 | 4/1973 | Znamirowski | 411/508 |
| 3,775,927 | 12/1973 | Meyer | 411/508 X |
| 3,889,320 | 6/1975 | Koscik | 24/297 |
| 3,909,883 | 10/1975 | Fegen | 411/508 X |
| 4,396,329 | 8/1983 | Wollar | 411/508 |
| 4,402,641 | 9/1983 | Arff | 411/510 |
| 4,427,328 | 1/1984 | Kojima | 411/508 |
| 4,431,355 | 2/1984 | Junemann | 411/508 X |
| 4,627,760 | 12/1986 | Yagi et al. | 24/297 X |
| 4,629,356 | 12/1986 | Hayashi | 411/508 X |

FOREIGN PATENT DOCUMENTS 2020733 11/1979 United Kingdom ................ 411/508

Primary Examiner—Neill Wilson
Attorney, Agent, or Firm—Fay, Sharpe, Beall, Fagan, Minnich & McKee

[57] ABSTRACT

A push-in type fastener for use in a preformed opening in a workpiece. The fastener is formed from plastic and includes a relatively rigid, axially elongated body. An enlarged head is formed at one end and a pair of resilient arms are integrally joined to the body at the other end. The arms are located diametrically opposite one another and extend at an angle toward the head. The free end zones of the arms have catch openings or notches adapted to engage the underside of a panel or workpiece opening when the fastener is inserted therein. In addition, the body includes cylindrical guide sections which lie opposite each other and are displaced 90 degrees radially from the arms. Truncated cone sections are formed above and below the cylindrical guide sections.

4 Claims, 1 Drawing Sheet

PUSH-IN FASTENER

BACKGROUND OF THE INVENTION

The subject invention is directed toward the fastener art and, more particularly, to a molded plastic, push-in type fastener.

The invention is especially concerned with a fastener that comprises a relatively rigid, elongated body having a head or closing part at one end and carrying two resilient, springy arms on diametrically opposite sides of the other end to extend outwardly at an angle to each other. The free ends of the arms have notches or catches such that when the fastener is pushed through workpiece opening, the catches engage the underside of the opening to retain the fastener in the workpiece.

Fasteners of this general type are known in the prior art. For example, U.S. Pat. No. 3,909,883 shows a fastener in which two resilient arms, after being positioned in a workpiece opening, are clamped to the workpiece to thereby fasten other parts to the workpiece. A disadvantage with this known construction is that the spacing between the head and the springy arms must be so dimensioned that a secure holding results only through a very slight tolerance range of workpiece thickness. If the workpiece has too great or too small a thickness, the holding acting of this prior fastener is greatly reduced. Moreover, the construction is such that two workpieces or plates, provided with openings, cannot be readily aligned or securely joined.

Also known in the prior art is a one-piece fastening element of plastic, which is designed as a self-centering "fir tree" clip. In this known construction, shown in West German published application No. 3,014,745, the body of the fastening element has several stays or fins, positioned one above the other, so that two or more workpieces each provided with an opening, can be joined together. A disadvantage here is that with lateral displacement of the openings, the fastening element cannot bring them into alignment. Thus, the danger of a misaligned installation cannot be excluded. Moreover, this known fastener is relatively expensive to manufacture.

Also belonging to the state of the art is a plastic fastener for the detachable fastening of functional or constructional parts on support plates, such as, for example, the body or frame components of a motor vehicle. As shown in West German published application No. 3,040,360, this fastener comprises a head part and a solid core shaft with several flexible lamella, standing out radially therefrom. This construction is also costly to manufacture, and is unable, in case of a lateral displacement of workpiece openings, to make a functionally correct lateral adjustment of the openings during mounting of the fastener.

SUMMARY OF THE INVENTION

Accordingly, a primary object of the present invention is to provide a fastener construction of the general kind mentioned so that, in a simple manner, two or more workpieces or construction parts each provided with fastener receiving openings, can be quickly and simply joined together with exact lateral adjustment of the openings to each other.

This problem is solved according to the subject invention by the fact that the fastener body has two cylindrical sections corresponding in size to the fastener openings and displaced by 90 degrees to a radial direction in relation to the arms. Above and below the cylindrical sections are truncated cone sections. In this way, the truncated cone section on the lower side, causes the two fastener openings to be brought into alignment during insertion of the fastener. As the fastener is moved to its final position of insertion, the cylindrical sections of the body enter the openings and, thus, produce in a simple fashion, a very exact adjustment of the openings. The centering of the openings thus produces a good centering and alignment of the workpieces or other elements to be joined together. Through the conical form in the lower zone, an easy introduction of the fastener is produced, since, on pressing in the cylindrical sections of the rigid body, the resilient arms are centered in the opening and a good mounting of the fastener is assured.

According to a further feature of the invention, the cylindrical sections and the truncated cone sections have stop tongues lying diagonally opposite each other. Thus, the guiding zone within the workpiece openings is enlarged in a simple fashion.

According to another feature of the invention, the cylindrical sections and the truncated cone sections may merge into the central portion of the body which is preferably rectangular in cross section. Thus, the fastener as a whole forms a very stable and rigid construction unit.

According to another, more limited aspect of the invention, the lower end of the arms and the rectangular form of the peg body may merge into an elliptical shape which corresponds in width to the width of the arms. Through the elliptical shape, the mounting or insertion process is greatly facilitated. Additionally, the elliptical body in transition to the rectangular body provides simple, easy to produce, geometric forms.

According to another feature of the invention, the end zones of each outer side of the arms may be provided with serrations or steps to produce several catches or latches. Catches or latches of this kind are already known (see, for example, U.S. Pat. No. 2,424,757), but in the present case, these lead to an advantageous further improvement since they allow the fastener of the invention to be suitable for use with workpieces of different thicknesses. The catches of the noted patent, on the other hand, are merely used to hold a shaft support in a carrier opening.

According to another feature of the invention the fastener head or closing part may have a resilient design, for example, in the nature of a spring plate. In this way, the fastener head, in combination with the catches, advantageously provides tolerance compensation for difference thicknesses of workpieces.

BRIEF DESCRIPTION OF THE DRAWINGS

The above and other objects and advantages of the invention will become apparent from the following detailed description when read in conjunction with the accompanying drawings wherein.

BRIEF DESCRIPTION OF A PREFERRED EMBODIMENT

Figure 1:
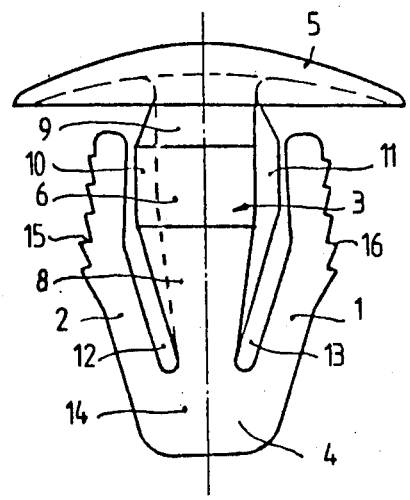
FIG. 1 shows a side elevational view of a fastener formed in accordance with a preferred embodiment of the invention; and, FIG. 2 is a top view of the fastener of FIG. 1.
Figure 2:
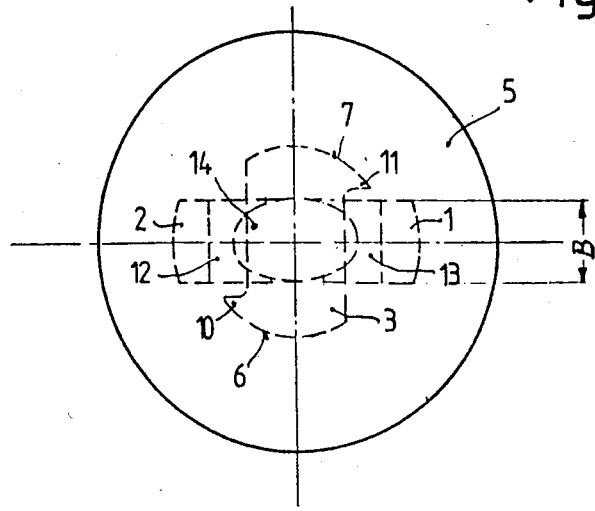

Referring more specifically to the drawings wherein the showing are for the purpose of illustrating a preferred embodiment of the invention only, and not for the purpose of limiting same, FIGS. 1 and 2 show the overall construction of the fastener as including a pair of resilient, springy arms 1 and 2 which are integrally joined to an elongated, relatively rigid main body 3 at an end zone 4. At the upper end of the body 3 an integral closure component 5 is shown in the form of a resilient, arched head. It should be understood, however, that other types of heads, pipe or tube holders, wiring straps or the like, could be substituted for or added in conjunction with, the closure component illustrated.

As shown, the arms 1 and 2 are positioned on diametrically opposite sides of the body 3 and extend upwardly and outwardly toward the component 5 at an angle as shown. Adjacent the outer free end zone along the radially outwardly facing surface of each arm 1 and 2 are a plurality of serrations or catch notches 15 and 16, respectively. The notches 15 and 16 are arranged in step-wise fashion.

Referring in particular to FIG. 2, it can be seen that the central portion of body 3 preferably has a generally rectangular cross-sectional shape which is displaced 90 degrees radially from the arms 1 and 2. In addition, the body 3 includes two generally semicylindrical sections 6 and 7 located opposite each other. The sections 6 and 7 extend longitudinally of the body and are sized so that their outer surfaces are only slightly smaller in diameter than the diameter of the opening in the workpiece or structural component in which the fastener is to be used.

The upper portions of the semi-cylindrical sections 6 and 7 merge into an upper truncated cone section 9 which is integrally joined to the component 5. Similarly, the lower portions of sections 6 and 7 merge into a truncated cone section 8. Preferably, the end zone of section 8 has a somewhat elliptical cross-section as best seen in FIG. 2.

From FIG. 2 it can also be seen that the semi-cylindrical sections 6 and 7 have extension or stop tongues 10 and 11 which extend in a generally circumferential direction on diagonally opposite sides of body 3. These stop tongues 10 and 11 serve to increase the extent of the generally cylindrical guiding surface provided by sections 6 and 7. It should also be noted, as best shown in FIG. 1, that the tongues 10 and 11 also merge into the truncated cone sections 8 and 9.

As is apparent, the special design of the fastener body 3 allows it to be used for joining several plates, panels, or structural members through preformed openings in the several members. The design and construction of the fastener facilitates the starting of insertion into the members because of the elliptical form 14 in the end section 4. As the fastener is moved into the openings, the openings are gradually adjusted and brought into alignment through entry of the cone section 8 until they are in exact alignment with the semi-cylindrical sections 6 and 7 directly in the openings. During the movement of the fastener body into the opening, the arms 1 and 2 deflect radially inwardly toward the body 3. As the fastener passes to its final seated position the arms, of course, deflect outwardly and the catch notches 15 and 16 engage under the edge of the innermost panel or structural member. The combination of the multiple stepped notches 15 and 16, together with the resilient head 5, allows the fastener to join panels or structural members having different thicknesses and to compensate for significant tolerance variations.

Through the significant longitudinal extent or length of the sections 6 and 7 of body 3, there is produced a good centering of the openings in the panels or structural members even when the openings are originally in a displaced relationship. For this reason, as seen in FIG. 1, the vertical extent or length of the sections 6 and 7 is generally only slightly less than the total vertical extent of the notches 15 and 16. In addition, to facilitate alignment of the openings and entry of the arms 1 and 2, the elliptical form of the nose or end portion 4 preferably has a width "B" substantially equal to or slightly greater than the width of arms 1 and 2. In this way, there is produced an advantageously simple shaping of the entire fastener.

The invention has been described in great detail sufficient to enable one of ordinary skill in the art to make and use the same. Obviously, modifications and alterations of the preferred embodiment will occur to others upon a reading and understanding of the specification. It is intended to include all such modifications and alterations insofar as they come within the scope of the appended claims or the equivalents thereof.

Having thus described the invention, it is claimed:

1. A push-in type fastener for use in a preformed cylindrical opening in a workpiece comprising:
   an axially elongated, relatively rigid main body formed from a plastic material;
   an enlarged head member formed on a first end of said main body;
   an elliptical portion formed on a second end of said main body;
   a pair of resilient arm members integrally joined to said elliptical portion in alignment therewith on diametrically opposite sides of said body, each said arm member extending outwardly of said body toward said first end and having a free end which includes at least one outwardly facing catch notch axially spaced from said head member;
   a pair of axially extending generally semicylindrical sections carried by said body on diametrically opposite sides thereof at locations intermediate said first and second ends and offset approximately 90 degrees from said arm members, said semi-cylindrical sections defining outer guide surfaces lying generally at a diameter corresponding to the diameter of said preformed cylindrical opening;
   said body further including a first truncated cone section extending from said semi-cylindrical sections toward said second end and joined with said elliptical portion, a second truncated cone section extending between said semi-cylindrical sections and said head member, said first and second truncated cone sections merging into said semi-cylindrical sections; and,
   tongue members lying diagonally opposite on another and forming extension of said outer guide surfaces and merging into said first and second truncated cone sections.

2. The push-in type fastener of claim 1 wherein a portion of said body located between said semi-cylinder sections is of a generally rectangular cross-section.

3. The push-in type fastener of claim 1 wherein said free ends of said arm members include a plurality of said catch notches arranged longitudinally of said arm members.

4. The push-in type fastener of claim 1 wherein said head member includes means which are resiliently deflectable in directions axially of said body for producing a bias on said body when said fastener is installed in said opening.

* * * * *

UNITED STATES PATENT AND TRADEMARK OFFICE
CERTIFICATE OF CORRECTION

PATENT NO. : 4,787,795

DATED : November 29, 1988

INVENTOR(S) : Willibald Kraus

It is certified that error appears in the above—identified patent and that said Letters Patent is hereby corrected as shown below:

Column 1, line 14 reading "through workpiece opening" should read ---through a workpiece opening---. Column 1, line 26 which reads "the holding acting of" should read ---the holding action of---. Column 4, line 52 which reads "opposite on another" should read ---opposite one another---. Column 4, line 57 which reads "said semi-cylinder sections" should read ---said semi-cylindrical sections---.

Signed and Sealed this

Ninth Day of May, 1989

Attest:

DONALD J. QUIGG

*Attesting Officer*  *Commissioner of Patents and Trademarks*